O. A. MYGATT.
METHOD FOR MAKING MOLDS FOR ORNAMENTAL GLASSWARE.
APPLICATION FILED DEC. 6, 1915.

1,226,609. Patented May 15, 1917.

WITNESSES
Max Greenstein

INVENTOR
Otis A. Mygatt
BY Joel B. Liberman
his ATTORNEY

UNITED STATES PATENT OFFICE.

OTIS A. MYGATT, OF NEW YORK, N. Y., ASSIGNOR TO HOLOPHANE GLASS COMPANY, OF NEW YORK, N. Y., A CORPORATION OF NEW JERSEY.

METHOD FOR MAKING MOLDS FOR ORNAMENTAL GLASSWARE.

1,226,609.   Specification of Letters Patent.   Patented May 15, 1917.

Original application filed July 1, 1909, Serial No. 505,438. Divided and this application filed December 6, 1915. Serial No. 65,204.

*To all whom it may concern:*

Be it known that I, OTIS A. MYGATT, a citizen of the United States, residing at New York city, New York, have invented certain new and useful Improvements in Methods for Making Molds for Ornamental Glassware, of which the following is a specification.

This application is a division of the application filed July 1, 1909, Serial Number 505438, for glass structure.

My invention consists in the preparation of a mold used in ornamentation of glassware in a new manner by which designs of various kinds are carried out in the glassware in sharp contrast to a background of fine parallel corrugations.

The invention is carried out by completely covering by mechanical means the mold sections (mold or plunger or both) with fine ribbings or grain-work surfaces, which may be prismatic or otherwise, and then cutting or chipping away, preferably by hand, certain portions of the ribbed background thus formed to form decorative designs in the glassware. The invention is explained more fully below together with the additional processes which help to make the finished glass article a decorative and beautiful object.

The entire surface of a mold or plunger or both is mechanically covered with homogeneous fine ribbings. These ribbings or lines may be horizontal or vertical or any net-work of ribbings may be chosen to simulate an engraved background. An effective form is a reproduction of cross-hatching. The background is uniform throughout and serves much the same purpose as the uniform background of a picture. The predetermined design is then chipped away by hand or by machinery and the ribbings may be either entirely effaced or merely reduced in size.

In the figures $m$ is a mold and $p$ is a plunger used in the manufacture of molded glass articles. The interior of the mold and exterior of the plunger are completely covered with fine parallel ribs or corrugations $y$ which produce in the finished glassware light modifying ribs, as shown at $r$ in Fig. 5. These ribs in the mold section are cut or chipped away by machinery or by hand to form transparent smooth designs $x$.

Figure 1:
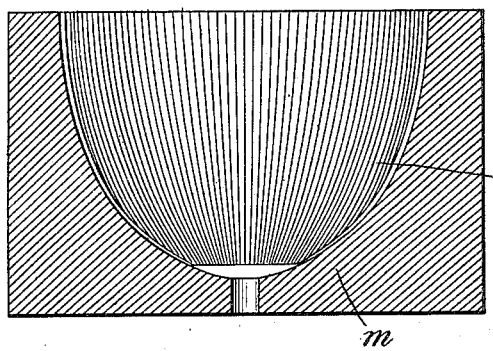
Figure 1 is a side elevation of a mold which is completely covered with fine ribbings.
Figure 3:
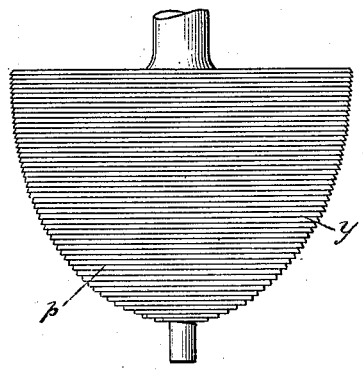
Fig. 3 is a side elevation of a plunger covered with fine ribbings.
Figure 2:
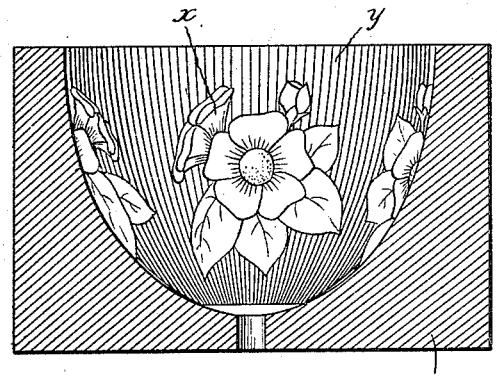
Fig. 2 is a similar side elevation in which the design has been chipped away.
Figure 4:
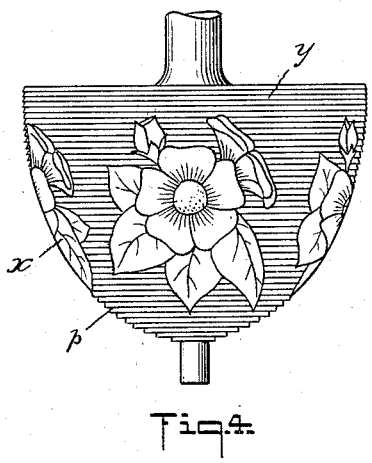
Fig. 4 is the same plunger to which my method of ornamentation has been applied.
Figure 5:
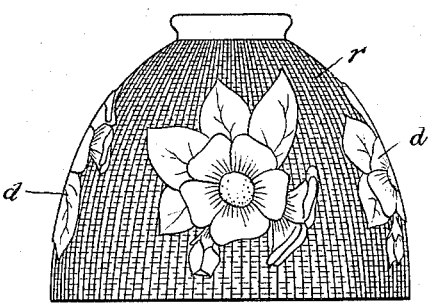
Fig. 5 is a side elevation of a globe produced by my method.

The globe in Fig. 5 may have either the smooth or chipped portion further ornamented by acid etching, sand blasting, enameling or the like.

Glass ornamentation formed by this method produces a cameo effect.

Hitherto when contrast of this sort was desired the background of fine ribs was cut in the mold sections, leaving the design free, but this caused an expensive process. My method is the reverse. When glass is pressed in the mold, the ornamentation formed by the design cuttings $x$ appear in sharp contrast to the even background $y$.

The plunger may be entirely smooth or else completely covered with corrugations, none of which have been removed. The ribbings may be prismatic, and where reflectors are desired the mold section may have radial prisms of 90 degrees.

What I claim and desire to secure by Letters Patent of the United States is:

1. The method of preparing a mold for the manufacture of ornamental glass articles which consists in covering the surface of the mold with fine ribbings and then removing portions of the said ribbings so that there will be produced in the glass a design upon an evenly ribbed background.

2. The method of preparing a mold for the manufacture of ornamental glass shades which consists in covering the surface of the mold with fine ribbings and then cutting away portions of the said ribbings in accordance with a predetermined design.

OTIS A. MYGATT.

Witnesses:
JOEL B. LIBERMAN,
MAX GREENSTEIN.

Copies of this patent may be obtained for five cents each, by addressing the "Commissioner of Patents, Washington, D. C."